United States Patent
Liu et al.

(10) Patent No.: US 12,317,785 B1
(45) Date of Patent: Jun. 3, 2025

(54) METHOD FOR PROMOTING ESTABLISHMENT OF ASSOCIATED PLANTS IN RESTORED WETLAND

(71) Applicant: Northeast Institute of Geography and Agroecology, Chinese Academy of Sciences, Changchun (CN)

(72) Inventors: Bo Liu, Changchun (CN); Ming Jiang, Changchun (CN); Haitao Wu, Changchun (CN); Yuanchun Zou, Changchun (CN); Shouzheng Tong, Changchun (CN); Meiying Wang, Changchun (CN); Wenguang Zhang, Changchun (CN); Guodong Wang, Changchun (CN); Yu An, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/942,856

(22) Filed: Nov. 11, 2024

(30) Foreign Application Priority Data

May 13, 2024 (CN) .......................... 202410585015.2

(51) Int. Cl.
*A01G 22/00* (2018.01)
(52) U.S. Cl.
CPC ................... *A01G 22/00* (2018.02)
(58) Field of Classification Search
CPC .. A01G 7/00; A01G 22/00; E02B 3/18; A01C 11/003; A01C 11/02; A01C 21/00; Y02A 40/22

USPC ...................................................... 47/58.1 R
See application file for complete search history.

(56) References Cited

FOREIGN PATENT DOCUMENTS

| CN | 105660159 | A | * | 6/2016 | ............ A01G 22/00 |
|----|-----------|---|---|--------|------------------------|
| CN | 105794470 | A | * | 7/2016 | |
| CN | 108718932 | A |   | 11/2018 | |
| CN | 111149630 | A | * | 5/2020 | ........... A01G 17/005 |
| CN | 113597911 | A | * | 11/2021 | |
| CN | 115997606 | A | * | 4/2023 | |
| CN | 116965190 | A | * | 10/2023 | |
| CN | 117502128 | A |   | 2/2024 | |
| CN | 117716942 | A | * | 3/2024 | |
| LU | 502395 | B1 | * | 1/2023 | |
| RU | 2005106630 | A |   | 8/2006 | |

(Continued)

OTHER PUBLICATIONS

Hoag, J. Chris, "Harvesting, Propagating, and Planting Wetland Plants", Jul. 2000, United States Department of Agriculture, Riparian/Wetland Project Information Series No. 14; https://www.nrcs.usda.gov/plantmaterials/idpmcarwproj14.pdf (Year: 2000).*

(Continued)

*Primary Examiner* — Kimberly S Berona
*Assistant Examiner* — Erica Michelle Huebner
(74) *Attorney, Agent, or Firm* — Piloff Passino & Cosenza LLP; Rachel K. Piloff; Sean A. Passino

(57) ABSTRACT

A method for promoting establishment of associated plants in a restored wetland is provided, relating to a method for restoring associated plants in a wetland. The method includes: step 1, establishing a target; step 2, preparing seedlings; step 3, constructing micro-habitat; step 4, planting the seedlings; step 5, managing water; step 6, investigating and monitoring; and step 7, removing isolation plates.

5 Claims, 5 Drawing Sheets

(56) References Cited

FOREIGN PATENT DOCUMENTS

WO     WO-2011031153 A1 *   3/2011    ......... A01G 13/0243
WO         2011134241 A     11/2011

OTHER PUBLICATIONS

Kettenring, Karin M. et al., "Need to Seed? Ecological, Genetic, and Evolutionary Keys to Seed-Based Wetland Restoration", Aug. 18, 2020, Frontiers in Environmental Science, vol. 8, Article 109; https://www.frontiersin.org/journals/environmental-science/articles/10.3389/fenvs.2020.00109/full (Year: 2020).*

Vanderklift, Mathew A. et al., "Using Propagules to Restore Coastal Marine Ecosystems", Sep. 15, 2020, Frontiers in Environmental Science, vol. 7, Article 724; https://www.frontiersin.org/journals/marine-science/articles/10.3389/fmars.2020.00724/full (Year: 2020).*

Wang Xue-Hong, et al., Natural restoration of plant species diversity on reclaimed Calamagrostis angustifolia wet-land. Chinese Journal of Ecology, vol. 28(9), Date of issue: Sep. 15, 2009, pp. 1808-1812 (abstract translated). DOI: 10.13292/j.1000-4890.2009.0315 Claims involved: 1-5.

Retrieval report dated Jun. 18, 2024 in SIPO application No. 202410585015.2.

Notification to Grant Patent Right for Invention dated Jun. 24, 2024 in SIPO application No. 202410585015.2.

* cited by examiner

METHOD FOR PROMOTING ESTABLISHMENT OF ASSOCIATED PLANTS IN RESTORED WETLAND

CROSS-REFERENCE TO RELATED APPLICATIONS

This application claims priority to Chinese Patent Application No. 202410585015.2, filed on May 13, 2024, the contents of which are hereby incorporated by reference.

TECHNICAL FIELD

The present disclosure relates to a method for restoring associated plants in a wetland.

BACKGROUND

Wetland is one of the three major ecosystem types in the world, which plays an irreplaceable role in maintaining biodiversity, regulating flood, regulating climate and degrading pollution. China attaches great importance to wetland protection and ecological restoration.

Wetland vegetation is one of the key factors in wetland ecosystem. In addition to the dominant species, there are often species associated with the dominant species in wetland vegetation, that is, companion species. Although the companion species is in a non-dominant position in the community, it has extensive relations with other species in the community, is an important part of the plant community, and even becomes a characteristic species of wetland vegetation. In addition, in terms of ecological service function, companion species often have higher utilization values such as ornamental, medicinal, spice and honey source. However, many studies have shown that some of the typical associated species in wetland vegetation have not appeared in the restored wetland after decades of restoration. At present, there is still a lack of technology to promote the establishment of the associated species in wetland vegetation, which limits the function of restoring wetland ecological services.

SUMMARY

An objective of the present disclosure is to solve the technical problem that the population of associated plants in the wetland is difficult to recover, and to provide a method for promoting establishment of associated plants in a restored wetland.

A method for promoting establishment of associated plants in a restored wetland are as follows:
- step 1, establishing a target: investigating vegetation of a restored wetland and an adjacent natural wetland thereof, obtaining a list of associated plant species, and determining associated species with a need of restoration in combination with a restoration target;
- step 2, preparing seedlings: when seedlings of target species are not available locally, collecting seeds or asexual propagules in the natural wetland, and raising the seedlings in greenhouses by using nutritional bowls to make a seedling age more than 3 months;
- step 3, constructing micro-habitat: determining planting area patches with an area of 0.16-1.5 square meter ($m^2$) in the restored wetland with a patch density of 1-200 patches per square hectometer (patches/$hm^2$); cleaning up vegetation and grass roots in the patches, and digging pits with a depth of 10-40 centimeter (cm), inserting wooden isolation plates around the pits, where the isolation plates are 10-40 cm higher than a ground surface after insertion, and each of the isolation plates has 5-15 holes with a diameter of 1 millimeter (mm), and a distance between two adjacent holes is 10-20 cm, allowing water to pass freely, but roots are difficult to pass through;
- step 4, planting the seedlings: planting the seedlings obtained in the step 2 in the pits together with a culture medium with a planting density of 16-64 plants/$m^2$, and reserving a space with a width of 5-20 cm around each of the pits to add the culture medium;
- step 5, managing water: after the seedlings are planted, immediately watering or introducing water around the pits, monitoring water status in each of planting patches, and keeping a surface water depth at 0.1-50 cm in a growing season;
- step 6, investigating and monitoring: cleaning up non-target plants in the planting patches in time, and investigating the height and density of planted plants in a vigorous growth period; and
- step 7, removing the isolation plates: at the end of the growing season, the planted plants are successfully established, removing the isolation plates to promote natural expansion of an associated plant population.

The present disclosure has following advantages.

The present disclosure determines the target species by investigating and comparing the vegetation of the restored wetland and the adjacent natural wetland, which is scientific and feasible.

The present disclosure follows the interspecific and intraspecific relationship of plants, and greatly improves the restoration success rate of associated species through local dense planting and deadline isolation.

The whole process according to the present disclosure does not use any chemical fertilizers and pesticides, and the used isolation materials are pollution-free and reusable, meeting the requirements of ecological environment protection.

DETAILED DESCRIPTION OF THE EMBODIMENTS

The technical solution of the present disclosure is not limited to the specific embodiments listed below, but also includes any combination among the specific embodiments.

Figure 5:
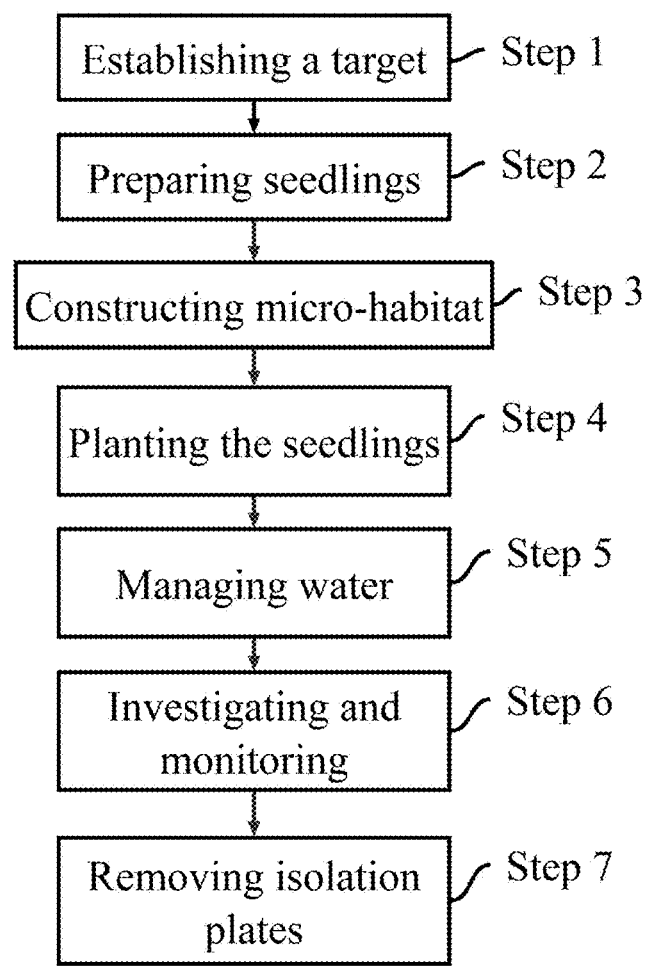
FIG. 5 is a flow chart of a method for promoting establishment of associated plants in a restored wetland according to the present disclosure.

Embodiment 1: in this embodiment, a method for promoting establishment of associated plants in a restored wetland is as follows, as shown in FIG. 5:

step 1, establishing a target: investigating the vegetation of the restored wetland and adjacent natural wetland thereof, obtaining the list of associated plant species, and determining the associated species that need to be restored in combination with the restoration target;

step 2, preparing seedlings: when the seedlings of the target species are not available locally, collecting the seeds or asexual propagules in the natural wetland, and raising the seedlings in greenhouses by using nutritional bowls to make the seedling age more than 3 months;

step 3, constructing micro-habitat: determining planting area patches with an area of 0.16-1.5 m$^2$ in the restored wetland with a patch density of 1-200 patches/hm$^2$; cleaning up the vegetation and grass roots in the patches, and digging pits with the depth of 10-40 cm, inserting wooden isolation plates around the pits, where the isolation plates are 10-40 cm higher than the ground surface after insertion, and each of the isolation plates has 5-15 holes with a diameter of 1 mm, and a distance between two adjacent holes is 10-20 cm, allowing water to pass freely, but roots are difficult to pass through;

step 4, planting the seedlings: planting the seedlings obtained in the step 2 in the pits together with the culture medium with a planting density of 16-64 plants/m$^2$, and reserving a space with a width of 5-20 cm around each of the pits to add the culture medium;

step 5, managing water: after the seedlings are planted, immediately watering or introducing the water around the pits, monitoring the water status in each of the planting patches, and keeping the surface water depth at 0.1-50 cm in the growing season;

step 6, investigating and monitoring: cleaning up the non-target plants in the planting patches in time, and investigating the height and density of the planted plants in the vigorous growth period; and step 7, removing the isolation plates: at the end of the growing season, the planted plants are successfully established, removing the isolation plates to promote the natural expansion of the associated plant population.

Embodiment 2: this embodiment differs from Embodiment 1 in that in step 2, when the seedlings of the target species are not available locally, seeds or asexual propagules are collected in the natural wetland, and the seedlings are raised in greenhouses by using nutritional bowls to cultivate 6-month-old seedlings. Others are the same as the Embodiment 1.

Embodiment 3: this embodiment differs from Embodiment 1 or 2 in that in step 2, when the seedlings of the target species are not available locally, seeds or asexual propagules are collected in the natural wetland, and the seedlings are raised in greenhouses by using nutritional bowls to cultivate one-year-old seedlings. Others are the same as the Embodiment 1 or 2.

Embodiment 4: this embodiment differs from one of Embodiment 1 to Embodiment 3 in that in step 3, planting area patches with an area of 1.0 m$^2$ are determined in the restored wetland with a patch density of 50 patches/hm$^2$, vegetation and grass roots in the patches are removed, pits with a depth of 30 cm are dug, and wooden isolation plates are inserted around the pits, and the isolation plates are 30 cm higher than the ground surface after insertion. Others are the same as one of the Embodiment 1 to Embodiment 3.

Embodiment 5: this embodiment differs from one of Embodiment 1 to Embodiment 4 in that in step 4, the planting density is 25 plants/m$^2$, and a space with a width of 10 cm is reserved around each of the pits to add the culture medium. Others are the same as one of the Embodiment 1 to Embodiment 4.

The following experiments were used to verify the effect of the present disclosure.

Sanjiang plain is rich in water resources and is a concentrated distribution area of freshwater marshes in China. The wetland types in this area mainly include herbaceous swamp, shrub swamp and swamp meadow, among which the herbaceous swamp has the largest area, reaching 486,500 hectares. The following experiments may effectively promote the rapid establishment of associated plants in a restored wetland to verify the effectiveness of the present disclosure.

Experiment 1

A method for promoting establishment of associated plants in a restored wetland are as follows:

step 1, establishing a target: investigating the vegetation of the restored wetland and adjacent natural wetland thereof, obtaining the list of associated plant species, and determining *Schoenoplectus tabernaemontani* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: determining planting area patches with an area of 1.0 m$^2$ in the restored wetland with a patch density of 50 patches/hm$^2$; cleaning up the vegetation and grass roots in the patches, and digging pits with the depth of 30 cm, inserting wooden isolation plates around the pits, where the isolation plates are 40 cm higher than the ground surface after insertion, and each of the isolation plates has 10 holes with a diameter of 1 mm, and a distance between two adjacent holes is 20 cm, allowing water to pass freely, but roots are difficult to pass through;

step 4, planting the seedlings: planting the seedlings obtained in the step 2 in the pits together with the culture medium, where each of the patches is planted with 64 plants (3,200 plants in total per hectare), and reserving a space with a width of 10 cm around each of the pits to add the culture medium;

step 5, managing water: after the seedlings are planted, immediately introducing the water around the pits, monitoring the water status in each of the planting patches, and keeping the surface water depth fluctuating between 10-50 cm in the growing season;

step 6, investigating and monitoring: cleaning up the non-target plants in the planting patches in time, and investigating the height and density of *Schoenoplectus tabernaemontani* in the vigorous growth period (early August); and step 7, removing the isolation plates: at the end of the growing season, the planted plants are successfully established, removing the isolation plates to promote the natural expansion of the *Schoenoplectus tabernaemontani* population; during the peak growing season of the second year (early August), continuing to investigate the height and density of *Schoenoplectus tabernaemontani*.

Experiment 2

A method for promoting establishment of associated plants in a restored wetland are as follows:

step 1, establishing a target: investigating the vegetation of the restored wetland and adjacent natural wetland thereof, obtaining the list of associated plant species, and determining *Schoenoplectus tabernaemontani* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: determining planting area patches with an area of 0.36 m$^2$ in the restored wetland with a patch density of 200 patches/hm$^2$; cleaning up the vegetation and grass roots in the patches, and digging pits with the depth of 30 cm, inserting wooden isolation plates around the pits, where the isolation plates are 40 cm higher than the ground surface after insertion, and each of the isolation plates has 5 holes with a diameter of 1 mm, and a distance between two adjacent holes is 20 cm, allowing water to pass freely, but roots are difficult to pass through;

step 4, planting the seedlings: planting the seedlings obtained in the step 2 in the pits together with the culture medium, where each of the patches is planted with 16 plants (3,200 plants in total per hectare), and reserving a space with a width of 10 cm around each of the pits to add the culture medium;

step 5, managing water: after the seedlings are planted, immediately introducing the water around the pits, monitoring the water status in each of the planting patches, and keeping the surface water depth fluctuating between 10-50 cm in the growing season;

step 6, investigating and monitoring: cleaning up the non-target plants in the planting patches in time, and investigating the height and density of *Schoenoplectus tabernaemontani* in the vigorous growth period (early August); and step 7, removing the isolation plates: at the end of the growing season, the planted plants are successfully established, removing the isolation plates to promote the natural expansion of the *Schoenoplectus tabernaemontani* population; during the peak growing season of the second year (early August), continuing to investigate the height and density of *Schoenoplectus tabernaemontani*.

Control 1

A method for promoting establishment of associated plants in a restored wetland are as follows:

step 1, establishing a target: investigating the vegetation of the restored wetland and adjacent natural wetland thereof, obtaining the list of associated plant species, and determining *Schoenoplectus tabernaemontani* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: according to the planting density of 3,200 plants/hm$^2$, evenly arranging points in the restored wetland, and digging pits with a depth of 30 cm at corresponding points, with a pit mouth diameter of about 10 cm;

step 4, planting the seedlings: planting the seedlings obtained in the step 2 in the pits together with the culture medium;

step 5, managing water: after the seedlings are planted, immediately introducing the water around the pits, and keeping the surface water depth fluctuating between 10-50 cm in the growing season; and step 6, investigating and monitoring: investigating the height and density of the planted plants in the vigorous growth period (early August); and during the peak growing season of the second year (early August), continuing to investigate the height and density of *Schoenoplectus tabernaemontani*.

Experiment 3

A method for promoting establishment of associated plants in a restored wetland are as follows:

step 1, establishing a target: investigating the vegetation of the restored wetland and adjacent natural wetland thereof, obtaining the list of associated plant species, and determining *Caltha palustris* var. *membranacea* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: determining planting area patches with an area of 0.49 m$^2$ in the restored wetland with a patch density of 25 patches/hm$^2$; cleaning up the vegetation and grass roots in the patches, and digging pits with the depth of 20 cm, inserting wooden isolation plates around the pits, where the isolation plates are 20 cm higher than the ground surface after insertion, and each of the isolation plates has 5 holes with a diameter of 1 mm, and a distance between two adjacent holes is 10 cm, allowing water to pass freely, but roots are difficult to pass through;

step 4, planting the seedlings: planting the seedlings obtained in the step 2 in the pits together with the culture medium, where each of the patches is planted with 9 plants (225 plants in total per hectare), and reserving a space with a width of 10 cm around each of the pits to add the culture medium;

step 5, managing water: immediately watering after the seedlings are planted, monitoring the water status in each of the planting patches, and keeping the surface water depth fluctuating between 0.1-10 cm in the growing season;

step 6, investigating and monitoring: cleaning up the non-target plants in the planting patches in time, and investigating the height and density of the *Caltha palustris* var. *membranacea* in the vigorous growth period (early August); and step 7, removing the isolation plates: at the end of the growing season, the planted plants are successfully established, removing the isolation plates to promote the natural expansion of the *Caltha palustris* var. *membranacea* population; during the peak growing season of the second year (early August), continuing to investigate the height and density of *Caltha palustris* var. *membranacea*.

Experiment 4 step 1, establishing a target: investigating the vegetation of the restored wetland and adjacent natural wetland thereof, obtaining the list of associated plant species, and determining *Caltha palustris* var. *membranacea* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: determining planting area patches with an area of 0.25 m² in the restored wetland with a patch density of 45 patches/hm²; cleaning up the vegetation and grass roots in the patches, and digging pits with the depth of 20 cm, inserting wooden isolation plates around the pits, where the isolation plates are 20 cm higher than the ground surface after insertion, and each of the isolation plates has 5 holes with a diameter of 1 mm, and a distance between two adjacent holes is 10 cm, allowing water to pass freely, but roots are difficult to pass through;

step 4, planting the seedlings: planting the seedlings obtained in the step 2 in the pits together with the culture medium, where each of the patches is planted with 5 plants (225 plants in total per hectare), and reserving a space with a width of 10 cm around each of the pits to add the culture medium;

step 5, managing water: immediately watering after the seedlings are planted, monitoring the water status in each of the planting patches, and keeping the surface water depth fluctuating between 0.1-10 cm in the growing season;

step 6, investigating and monitoring: cleaning up the non-target plants in the planting patches in time, and investigating the height and density of *Caltha palustris* var. *membranacea* in the vigorous growth period (early August); and step 7, removing the isolation plates: at the end of the growing season, the planted plants are successfully established, removing the isolation plates to promote the natural expansion of the *Caltha palustris* var. *membranacea* population; during the peak growing season of the second year (early August), continuing to investigate the height and density of *Caltha palustris* var. *membranacea*.

Control 2

A method for promoting establishment of associated plants in a restored wetland are as follows:

step 1, establishing a target: investigating the vegetation of the restored wetland and adjacent natural wetland thereof, obtaining the list of associated plant species, and determining *Caltha palustris* var. *membranacea* as the target species in combination with the restoration target;

step 2, preparing seedlings: collecting seeds in the natural wetland, raising seedlings in greenhouses by using nutritional bowls to cultivate one-year-old seedlings;

step 3, constructing micro-habitat: according to the planting density of 225 plants/hm², evenly arranging points in the restored wetland, and digging pits with a depth of 20 cm at corresponding points, with a pit mouth diameter of about 15 cm;

step 4, planting the seedlings: planting the seedlings obtained in the step 2 in the pits together with the culture medium;

step 5, managing water: immediately watering after the seedlings are planted, and keeping the surface water depth fluctuating between 0.1-10 cm during the growing season; and step 6, investigating and monitoring: cleaning up the non-target plants in the planting patches in time, and investigating the height and density of *Caltha palustris* var. *membranacea* in the vigorous growth period (early August); and during the peak growing season of the second year (early August), continuing to investigate the height and density of *Caltha palustris* var. *membranacea*.

Figure 1:
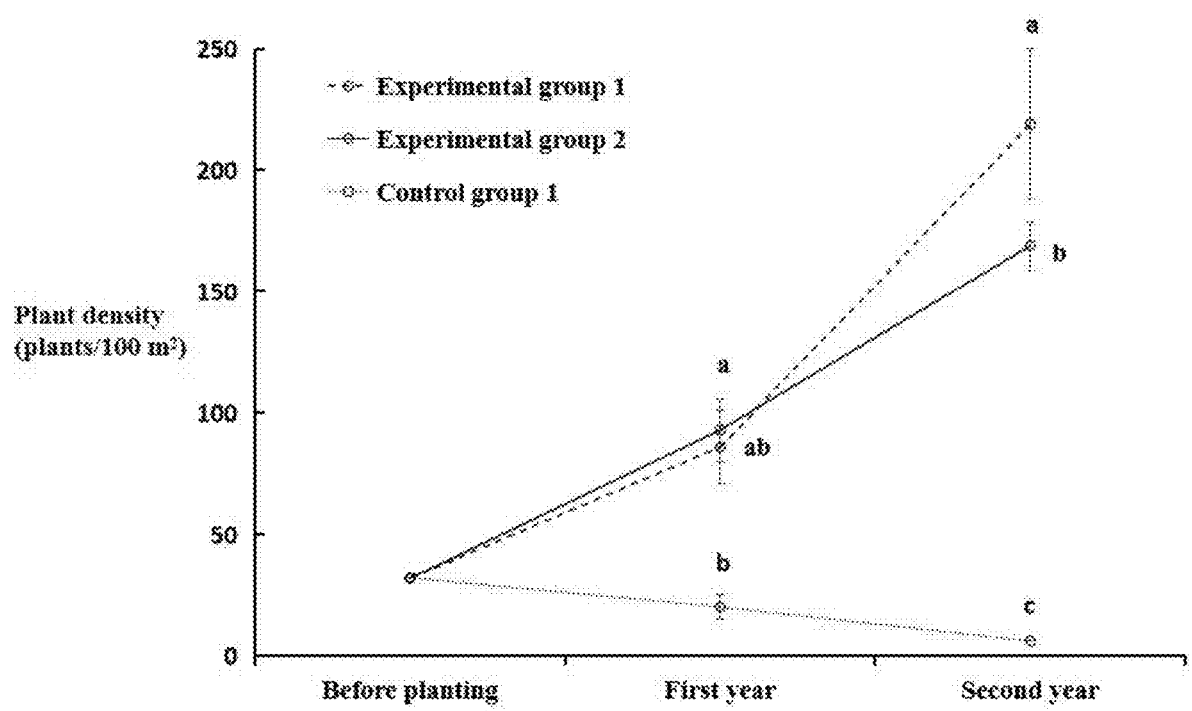
FIG. 1 shows the influence of different treatments on the plant density of *Schoenoplectus tabernaemontani* (different lowercase letters in the same column indicate that the difference reaches a significant level, $P<0.05$)
Figure 2:
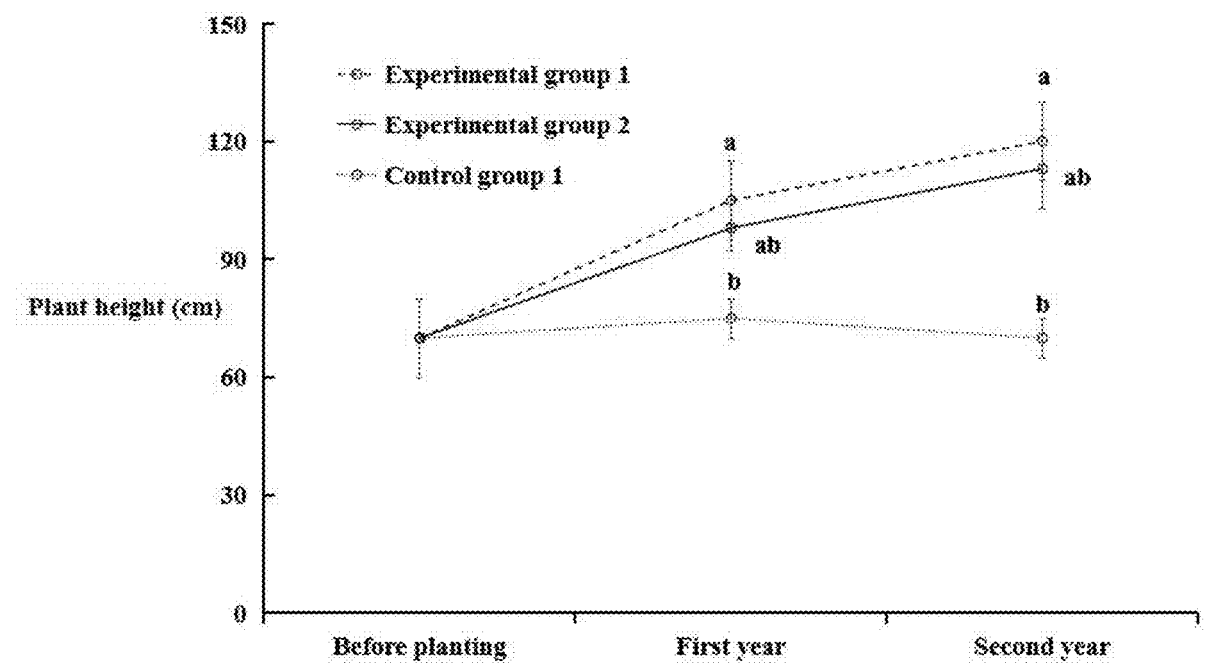
FIG. 2 shows the influence of different treatments on the plant height of *Schoenoplectus tabernaemontani* (different lowercase letters in the same column indicate that the difference reaches a significant level, $P<0.05$)
Figure 3:
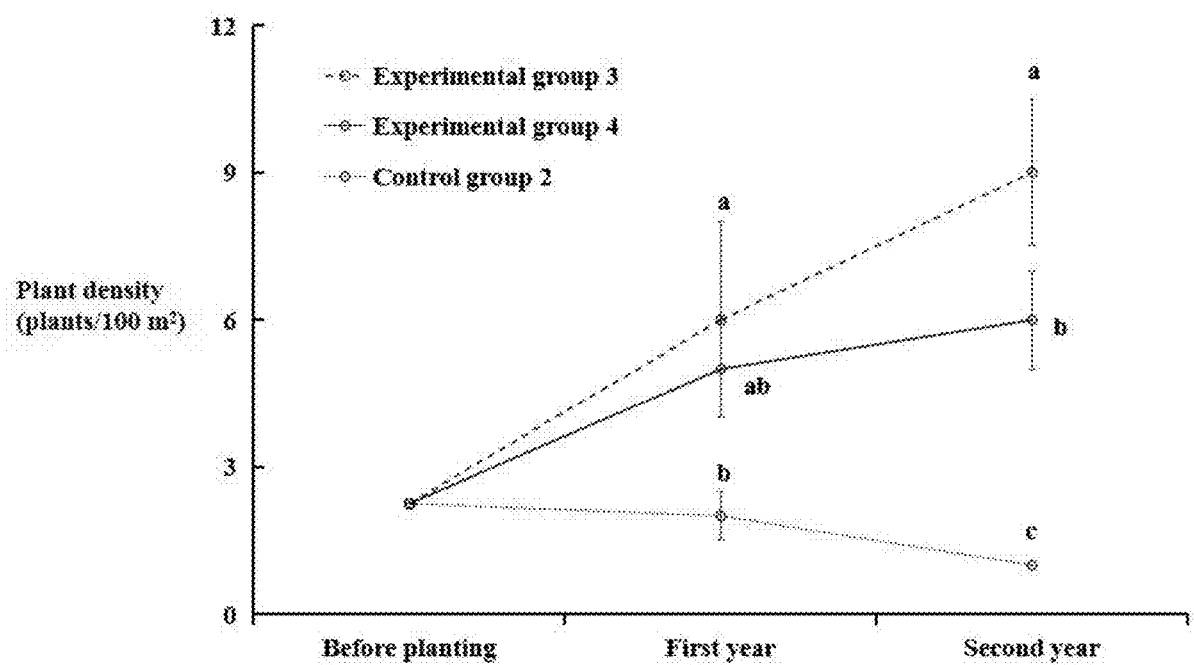
FIG. 3 shows the influence of different treatments on the plant density of *Caltha palustris* var. *membranacea* (different lowercase letters in the same column indicate that the difference reaches a significant level, $P<0.05$)
Figure 4:
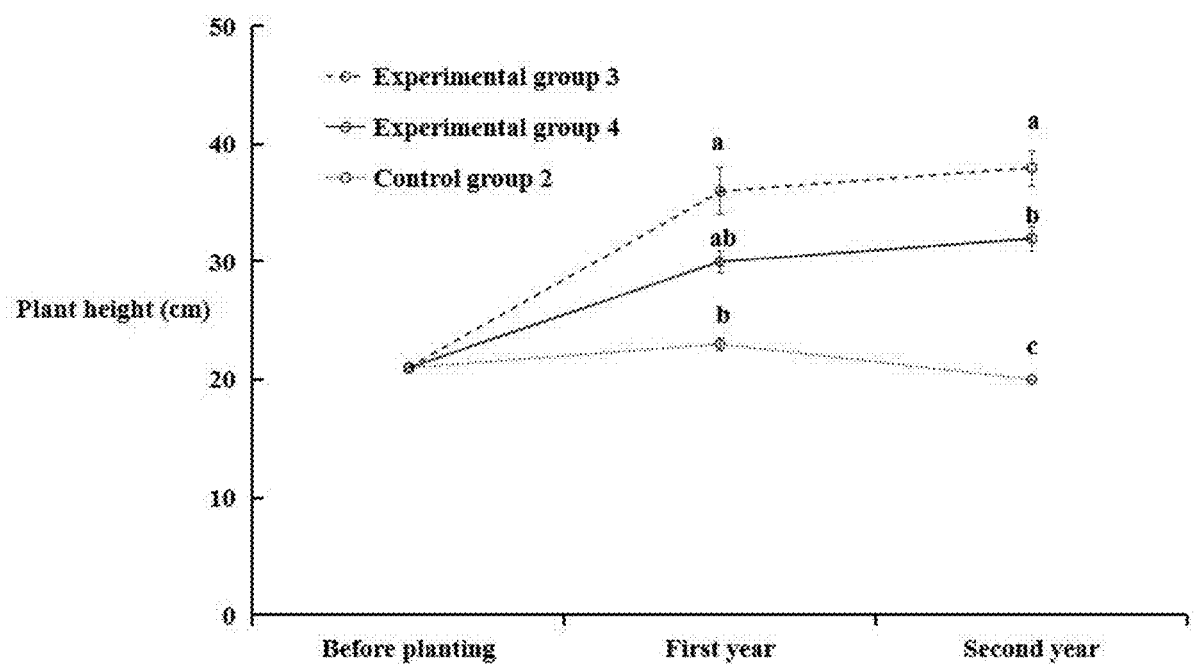
FIG. 4 shows the influence of different treatments on the plant height of *Caltha palustris* var. *membranacea* (different lowercase letters in the same column indicate that the difference reaches a significant level, $P<0.05$).

Table 1 shows the species composition of the restored wetland and the natural wetland in the experiment. The shared species refers to the species that appear in both the restored wetland and the natural wetland. The restored wetland has *Typha orientalis*+*Phragmites australis* community in deep water (water depth 30-60 cm), and *Glyceria spiculosa* community in shallow water (water depth 0-20 cm). The natural wetland mainly has *Carex appendiculata*+*Glyceria spiculosa* community and *Phragmites australis* community. From Table 1, it may be seen that the associated plants such as *Caltha palustris* var. *membranacea* and *Schoenoplectus tabernaemontani* only appear in the natural wetland. FIG. 1 and FIG. 2 show the influences of different experimental treatments on the growth and regeneration of *Schoenoplectus tabernaemontani*, and FIG. 3 and FIG. 4 show the influences of different experimental treatments on the growth and regeneration of *Caltha palustris* var. *membranacea*. Different letters in the same column indicate significant differences between treatments (P<0.05). The plant height and density of target species in different experimental treatments were investigated when the plant biomass was the maximum in August. Five quadrats with an area of 200 m² were randomly set for each experimental treatment, and the total number of target species in the quadrats was investigated, and 20 plants were randomly selected (if less than 20 plants, all plants were selected) to measure and calculate the average plant height.

The results showed that different experimental treatments have significant influences on the growth and regeneration of *Schoenoplectus tabernaemontani* and *Caltha palustris* var. *membranacea* (P<0.05). It may be seen from FIG. 1 and FIG. 2 that the plant density and average height of *Schoenoplectus tabernaemontani* in the two experimental groups are 31%-40% and 330%-365% higher than the plant density and average height in the control respectively after one year of restoration. After two years of restoration, the plant density and average height of *Schoenoplectus tabernaemontani* are the highest in the experimental group 1 and the lowest in the control group. It may be seen from FIG. 3 and FIG. 4 that after one year of restoration, the plant density and average height of *Caltha palustris* var. *membranacea* in the two experimental groups are 150%-200% and 30%-57% higher than the plant density and average height of the control respectively. After two years of restoration, the plant density and average height of *Caltha palustris* var. *membranacea* are the highest in experimental group 3, followed by experimental group 4, and the control group is the lowest, with significant differences among different treatments. This showed that in the primary stage of restoration of wetland associated species, local encryption measures may leverage the advantages of intraspecific interaction of associated species, achieving the purpose of rapid population establishment. The artificial isolation measures greatly reduce the influence of non-target plants on the settlement and establishment of associated species. After the target plants are restored for 1-2 years, the population may be regenerated and propagated through asexual reproduction, and some plants may already blossom and bear fruit, which indicates the successful restoration of associated plants.

TABLE 1

Species composition characteristics of natural wetland
and restored wetland in Sanjiang plain

| Shared species | Natural wetland species | Restored wetland species |
|---|---|---|
| *Sagittaria trifolia* subsp. *leucoptala* | *Caltha palustris* var. *membranacea* | *Hordeum brevisubulatum* |
| *Persicaria maculosa* | *Schoenoplectus tabernaemontani* | *Echinochloa crus-galli* |
| *Acorus calamus* | *Salvinia natans* | *Xanthium strumarium* |
| *Deyeuxia purpurea* | *Scutellaria baicalensis* | *Atractylodes Lancea* |
| *Lycopus lucidus* | *Stachys baicalensis* | *Plantago asiatica* |
| *Lemna minor* | *Glycine soja* | *Eleocharis dulcis* |
| *Phragmites australis* | *Bistorta vivipara* | *Rorippa globosa* |
| *Carex pseudocuraica* | *Carex lasiocarpa* | *Calamagrostis epigeios* |
| *Lythrum salicaria* | *Iris laevigata* | *Bidens pilosa* |
| *Equisetum arvense* | *Carex appendiculata* | *Erigeron canadensis* |
| *Typha laxmannii* | | *Artemisia annua* |
| *Glyceria spiculosa* | | *Chenopodium glaucum* |
| *Typha orientalis* | | *Cirsium japonicum* |
| *Nymphoides peltata* | | *Arthraxon hispidus* |
| *Alisma plantago-aquatica* | | *Artemisia stolonifera* |
| | | *Echinochloa caudata* |
| | | *Agrimonia pilosa* |
| | | *Cnidium monnieri* |
| | | *Centipeda minima* |
| | | *Pseudognaphalium affine* |
| | | *Rumex acetosa* |
| | | *Stellaria radians* |
| | | *Beckmannia syzigachne* |

What is claimed is:

1. A method for promoting establishment of associated plants in a restored wetland, wherein the method for promoting the establishment of the associated plants in the restored wetland is as follows:
   I. establishing a target: investigating vegetation of a restored wetland and an adjacent natural wetland thereof, obtaining a list of associated plant species, and determining associated species with a need of restoration;
   II. preparing seedlings: when seedlings of target species are not available locally, collecting seeds or asexual propagules in the natural wetland, and raising the seedlings in greenhouses by using nutritional bowls to make a seedling age more than 3 months;
   III. constructing micro-habitat: determining planting area patches of 0.16-1.5 m² in the restored wetland with a patch density of 1-200 patches/hm²; cleaning up vegetation and grass roots in the patches, and digging pits with a depth of 10-40 cm, inserting wooden isolation plates around the pits, wherein the isolation plates are 10-40 cm higher than a ground surface after insertion, and each of the isolation plates has 5-15 holes with a diameter of 1 mm, and a distance between two adjacent holes is 10-20 cm, allowing water to pass freely;
   IV. planting the seedlings: planting the seedlings obtained in step II in the pits together with a culture medium with a planting density of 16-64 plants/m², and reserving a space with a width of 5-20 cm around each of the pits to add the culture medium;
   V. managing water: after the seedlings are planted, immediately watering or introducing water around the pits, monitoring water status in each of the patches, and keeping a surface water depth at 0.1-50 cm in a growing season;
   VI. investigating and monitoring: cleaning up non-target plants in the patches in time, and investigating a height and a density of planted plants in a vigorous growth period; and
   VII. removing the isolation plates: at an end of a growing season, the planted plants are established, removing the isolation plates to promote natural expansion of an associated plant population.

2. The method for promoting the establishment of the associated plants in the restored wetland according to claim 1, wherein in the step II, when the seedlings of the target species are not available locally, the seeds or the asexual propagules are collected in the natural wetland, and the seedlings are raised in the greenhouses by using the nutritional bowls to cultivate 6-month-old seedlings.

3. The method for promoting the establishment of the associated plants in the restored wetland according to claim 1, wherein in the step II, when the seedlings of the target species are not available locally, the seeds or the asexual propagules are collected in the natural wetland, and the seedlings are raised in the greenhouses by using the nutritional bowls to cultivate one-year-old seedlings.

4. The method for promoting the establishment of the associated plants in the restored wetland according to claim 1, wherein in step III, planting area patches of 1.0 m² are determined in the restored wetland with a patch density of 50 patches/hm², vegetation and grass roots in the patches are removed, pits with a depth of 30 cm are dug, and the wooden isolation plates are inserted around the pits, and the isolation plates are 30 cm higher than the ground surface after the insertion.

5. The method for promoting the establishment of the associated plants in the restored wetland according to claim 1, wherein in step IV, the planting density is 25 plants/m², and a space with a width of 10 cm is reserved around the each of the pits to add the culture medium.

* * * * *